US012559987B2

(12) United States Patent
Chen

(10) Patent No.: US 12,559,987 B2
(45) Date of Patent: Feb. 24, 2026

(54) SWITCHING DEVICE FOR DELAYED UNLOCKING FUNCTION

(71) Applicant: Shanghai Ming Wei Hardware Co., Ltd., Shanghai (CN)

(72) Inventor: Jung-Chung Chen, Shanghai (CN)

(73) Assignee: SHANGHAI MING WEI HARDWARE CO., LTD., Shanghai (CN)

( * ) Notice: Subject to any disclaimer, the term of this patent is extended or adjusted under 35 U.S.C. 154(b) by 75 days.

(21) Appl. No.: 18/745,221

(22) Filed: Jun. 17, 2024

(65) Prior Publication Data

US 2025/0223843 A1 Jul. 10, 2025

(30) Foreign Application Priority Data

Jan. 9, 2024 (TW) ................................ 113200286

(51) Int. Cl.
*E05B 65/10* (2006.01)
*E05B 47/00* (2006.01)

(52) U.S. Cl.
CPC ........ *E05B 65/108* (2013.01); *E05B 65/1053* (2013.01); *E05B 2047/0067* (2013.01); *E05B 2047/0088* (2013.01)

(58) Field of Classification Search
CPC ...... E05B 17/22; E05B 47/00; E05B 65/1053; E05B 65/108; E05B 65/10; E05B 65/1006; E05B 2047/0067; E05B 2047/0088; E05B 2047/0084; Y10T 292/0822; Y10T 292/0908
USPC ............................................ 70/92, 267, 268
See application file for complete search history.

(56) References Cited

U.S. PATENT DOCUMENTS 4,257,631 A * 3/1981 Logan, Jr. ............ E05B 43/005 292/251.5
4,720,128 A * 1/1988 Logan, Jr. ............ E05B 65/108 292/251.5
5,011,199 A * 4/1991 Lowe ................. E05B 47/0002 292/DIG. 65

(Continued)

FOREIGN PATENT DOCUMENTS

CN 114046108 A * 2/2022 .......... E05B 63/185
EP 3219885 A1 * 9/2017 ......... E05B 65/1053

*Primary Examiner* — Steven A Tullia
(74) *Attorney, Agent, or Firm* — MUNCY, GEISSLER, OLDS & LOWE, P.C.

(57) ABSTRACT

A switching device for delayed unlocking function, disposed at a flat-push type emergency door-lock device having a flat-push rod, including a switching-device base, a pushing swing arm, a linkage rod, a sensing assembly, a timing control assembly and an electromagnetic traction assembly. The pushing swing arm is disposed at the switching-device base and includes a stopper, being switchably maintained at an avoidance position in a delayed unlocking function disabled state and preset at a stop position in a delayed unlocking function enabled state. The timing control assembly starts timing when the sensing assembly senses the flat-push rod is pushed, and it makes the electromagnetic traction assembly to drag the pushing swing arm to cause the stopper to move from the stop position to the avoidance position after the timing reaches a predetermined delay time. When the stopper is at the avoidance position, the flat-push rod is avoided to allow the flat-push rod to continue to be pushed to complete unlocking.

8 Claims, 13 Drawing Sheets

(56) References Cited

U.S. PATENT DOCUMENTS

| | | | | | |
|---|---|---|---|---|---|
| 5,085,475 | A * | 2/1992 | Austin | E05B 65/1046 | 292/144 |
| 5,412,961 | A * | 5/1995 | Cain | E05B 63/0065 | 70/92 |
| 5,429,399 | A * | 7/1995 | Geringer | E05B 45/06 | 292/DIG. 65 |
| 5,525,880 | A * | 6/1996 | Geringer | E05F 15/79 | 318/446 |
| 5,988,708 | A * | 11/1999 | Frolov | E05B 65/1053 | 292/168 |
| 6,048,000 | A * | 4/2000 | Geringer | E05B 47/0607 | 70/92 |
| 6,386,597 | B1 * | 5/2002 | Walsh, III | E05B 65/1053 | 292/201 |
| 6,565,130 | B1 * | 5/2003 | Walsh, III | E05B 47/0002 | 292/201 |
| 7,469,942 | B2 * | 12/2008 | Whitaker | E05B 65/108 | 70/92 |
| 7,832,778 | B2 * | 11/2010 | Whitaker | E05B 65/1053 | 70/92 |
| 8,070,192 | B2 * | 12/2011 | Tien | E05B 65/1053 | 70/92 |
| 8,182,003 | B2 * | 5/2012 | Dye | E05B 65/1053 | 292/216 |
| 8,495,836 | B2 * | 7/2013 | Lowder | E05B 65/1053 | 49/394 |
| 8,978,305 | B2 * | 3/2015 | Morstatt | E05B 65/1093 | 292/201 |
| 10,301,845 | B2 * | 5/2019 | Hsu | E05B 47/023 | |
| 10,968,664 | B2 * | 4/2021 | Arlinghaus | E05B 47/0001 | |
| 11,035,150 | B2 * | 6/2021 | Brennan | E05B 47/0657 | |
| 11,255,109 | B2 * | 2/2022 | Lacy | E05C 19/166 | |
| 11,299,914 | B2 * | 4/2022 | Brennan | E05B 65/108 | |
| 11,898,373 | B2 * | 2/2024 | Woodley | E05B 65/1093 | |
| 2024/0328201 | A1 * | 10/2024 | Davies | E05B 65/1086 | |

* cited by examiner

SWITCHING DEVICE FOR DELAYED UNLOCKING FUNCTION

This application claims the benefit of Taiwan Patent Application Serial No. 113200286, filed on Jan. 9, 2024, the subject matter of which is incorporated herein by reference.

BACKGROUND OF THE INVENTION

(1) Field of the Invention

The invention relates to a switching device, and more particularly to a switching device for delayed unlocking function that is disposed at a flat-push type emergency door-lock device and can decide whether the switching device activates the delayed unlocking function.

(2) Description of the Prior Art

In order for people to quickly escape from the building when an emergency disaster occurs, an emergency door and an emergency door lock are usually disposed at the escape exit. Due to the need for escape, it is often necessary to allow people in the room to quickly unlock and escape directly. However, as far as specific buildings are concerned, due to certain regulatory needs, people inside the building must meet certain conditions before they can be allowed to leave. For example, when the interior of the building is a business space in a shopping mall, people inside the building must firstly complete the checkout actions before they can be allowed to leave. If some unscrupulous consumers leave through the emergency door without checking out after taking the goods, it will cause unreasonable property losses to the shopping mall.

In the prior art, in order to prevent the occurrence of this situation and take into account the need for escape, various countries have formulated corresponding fire regulations to regulate the allowable delayed unlocking time. In practice, according to the fire regulations of different countries, the allowable delayed unlocking time is usually between 15 and 30 seconds. In the meanwhile, it is usually used in conjunction with a buzzer, so that shopping mall operators have extra time to respond and dispatch personnel immediately before the door-locking device is unlocked.

However, the internal mechanisms used to drive the unlocking of flat-push type emergency door-lock devices for delayed unlocking currently on the market are not the same at all. That is to say, different delayed unlocking functional components must be installed for different delayed unlocking flat-push type emergency doors. As a result, the delayed unlocking function cannot be realized without changing the original unlocking-related mechanisms, thus increasing the preparation and installation costs of the delayed unlocking functional components.

SUMMARY OF THE INVENTION

In view of the fact that in the prior arts, different delayed unlocking functional components must be installed for different flat-push type emergency door-lock devices, there is a common problem of increased preparation and installation costs of delayed unlocking functional components. Accordingly, it is an object of the present invention to provide a switching device for delayed unlocking function, which is to set the blocking mechanism of the delayed unlocking function away from the mechanisms related to unlocking in the door-lock base of the flat-push type emergency door-lock device, and to avoid the original internal mechanisms of the flat-push type emergency door-lock device. That is to say, when the flat-push rod of the flat-push type emergency door-lock device is pressed down or lifted up, the original internal mechanisms will not have contact movement with the blocking mechanism of delayed unlocking function, so that the above problems can be solved without changing the original unlocking-related mechanisms.

On the basis of the above, the necessary technical means adopted by the present invention to solve the problems of the prior art is to provide a switching device for delayed unlocking function (hereinafter referred to as the “function switching device”), disposed at a flat-push type emergency door-lock device, the flat-push type emergency door-lock device being disposed at an emergency door board, the flat-push type emergency door-lock device including a door-lock base and a flat-push rod disposed at the door-lock base, a concave groove being formed on one side of the flat-push rod facing the door-lock base, the switching device for delayed unlocking function comprising a switching-device base, a pushing swing arm, a linkage rod, a sensing assembly, a timing control assembly and an electromagnetic traction assembly.

The switching-device base is fixed on the door-lock base. The pushing swing arm is pivoted to the switching-device base and includes a stopper, wherein when the pushing swing arm is driven, the stopper is moved between a stop position and an avoidance position, wherein the stopper is switchably at the avoidance position in a delayed unlocking function disabled state and is preset at the stop position in a delayed unlocking function enabled state. The linkage rod is pivoted to the door-lock base and is connected to the flat-push rod in a coherent manner.

The sensing assembly is fixed on the switching-device base and is disposed corresponding to the linkage rod, used to send an unlocking-triggering signal by sensing that the linkage rod changes from being in contact with the sensing assembly to being separated from the sensing assembly according to the flat-push rod is pushed in the delayed unlocking function enabled state. The timing control assembly is electrically connected to the sensing assembly, thereby sending a state-switching signal after the unlocking-triggering signal is received and a predetermined delay time is passed. The electromagnetic traction assembly is disposed at the switching-device base and drags the pushing swing arm to cause the stopper to move from the stop position to the avoidance position after receiving the state-switching signal.

Wherein when the stopper is at the stop position, the flat-push rod is blocked to prevent the flat-push rod from being pushed and prohibit unlocking; wherein when the stopper is at the avoidance position, the stopper avoids the flat-push rod corresponding to the concave groove, thereby allowing the flat-push rod to continue to be pushed to complete unlocking.

Among the ancillary technical means derived from the above necessary technical means, preferably, the pushing swing arm may further include a swing arm body and a stopper plate. The swing arm body is pivoted to the switching-device base, and the stopper is plugged and fixed on the swing arm body. The stopper plate extends from the swing arm body and is fixed on the swing arm body, including a stroke limiting groove to limit the movement of the electromagnetic traction assembly.

The function switching device may further include a delayed unlocking function switching lock and an on/off position-detecting module. The delayed unlocking function switching lock is disposed at the door-lock base and is driven by a key to move between a function-enabled position and a function-disabled position. The on/off position-detecting module is disposed at the door-lock base and is electrically connected to the timing control assembly, thereby when sensing the delayed unlocking function switching lock is at the function-enabled position, a function-on signal is sent to the timing control assembly, so that the timing control assembly enters the delayed unlocking function enabled state; thereby when sensing the delayed unlocking function switching lock is at the function-disabled position, a function-off signal is sent to the timing control assembly so that the timing control assembly enters the delayed unlocking function disabled state.

The on/off position-detecting module may further include a first micro-switch sensor. When the delayed unlocking function switching lock is at the function-enabled position, the first micro-switch sensor contacts with the delayed unlocking function switching lock to generate and send the function-on signal accordingly; when the delayed unlocking function switching lock is at the function-disabled position, the first micro-switch sensor is separated from the delayed unlocking function switching lock to generate and send the function-off signal accordingly.

The function switching device may further include a lever. The lever is disposed at the door-lock base and is driven by the delayed unlocking function switching lock, wherein when the delayed unlocking function switching lock is at the function-enabled position, the lever contacts with the first micro-switch sensor so that the first micro-switch sensor detects that the delayed unlocking function switching lock is at the function-enabled position.

The timing control assembly may include a circuit board, a controller and a timer. The circuit board is disposed at the door-lock base. The controller is disposed at the circuit board and is electrically connected to the sensing assembly, used to generate a timing signal after receiving the unlocking-triggering signal in the delayed unlocking function enabled state. The timer is electrically connected to the controller and is used to start timing after receiving the timing signal in the delayed unlocking function enabled state, used to send a timing-off signal after the timing reaches the predetermined delay time, thereby causing the controller to send the state-switching signal.

The function switching device may further include a buzzer. The buzzer is electrically connected to the controller. The controller further generates an alarm signal after receiving the unlocking-triggering signal in the delayed unlocking function enabled state and transmits the alarm signal to the buzzer to cause the buzzer to issue an alarm. The sensing assembly may include a second micro-switch sensor. The second micro-switch sensor is disposed at the switching-device base and contacts with the linkage rod, wherein when the linkage rod is driven by the flat-push rod in the delayed unlocking function enabled state so that the second micro-switch sensor is separated from the linkage rod and sends the unlocking-triggering signal.

To summarize, because in the switching device for delayed unlocking function provided by the present invention, the sensing component installed in the door-lock base is used to sense that the flat-push rod is pushed, thereby activating the delayed unlocking function. After the predetermined delay time is reached, the stopper is dragged to move to the avoidance position so that the flat-push rod continues to move along the push-down driving stroke and the unlocking is delayed.

Additionally, since all the elements related to the delayed unlocking means (including the pushing swing arm, the sensing assembly, the timing control assembly and the electromagnetic traction assembly) are all located away from the mechanisms related to unlocking and are installed in the door-lock base of the flat-push type emergency door-lock device, and the original internal mechanisms of the flat-push type emergency door-lock device are avoided, that is to say, when the flat-push rod of the flat-push type emergency door-lock device is pressed down or lifted up, the original internal mechanisms will not have contact movement with the blocking mechanism of delayed unlocking function.

Therefore, the delayed unlocking function can be realized without changing the original unlocking-related mechanisms at all, thereby achieving the effect of reducing the preparation and installation costs of sensing and delayed unlocking functional components.

All these objects are achieved by the switching device for delayed unlocking function described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The present invention disclosed herein is directed to a switching device for delayed unlocking function. It can be widely used in different types of flat-push type emergency door-lock devices, and its combinations and variations are countless. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention. Here, only one preferred embodiment is listed for detailed description.

Figure 1:
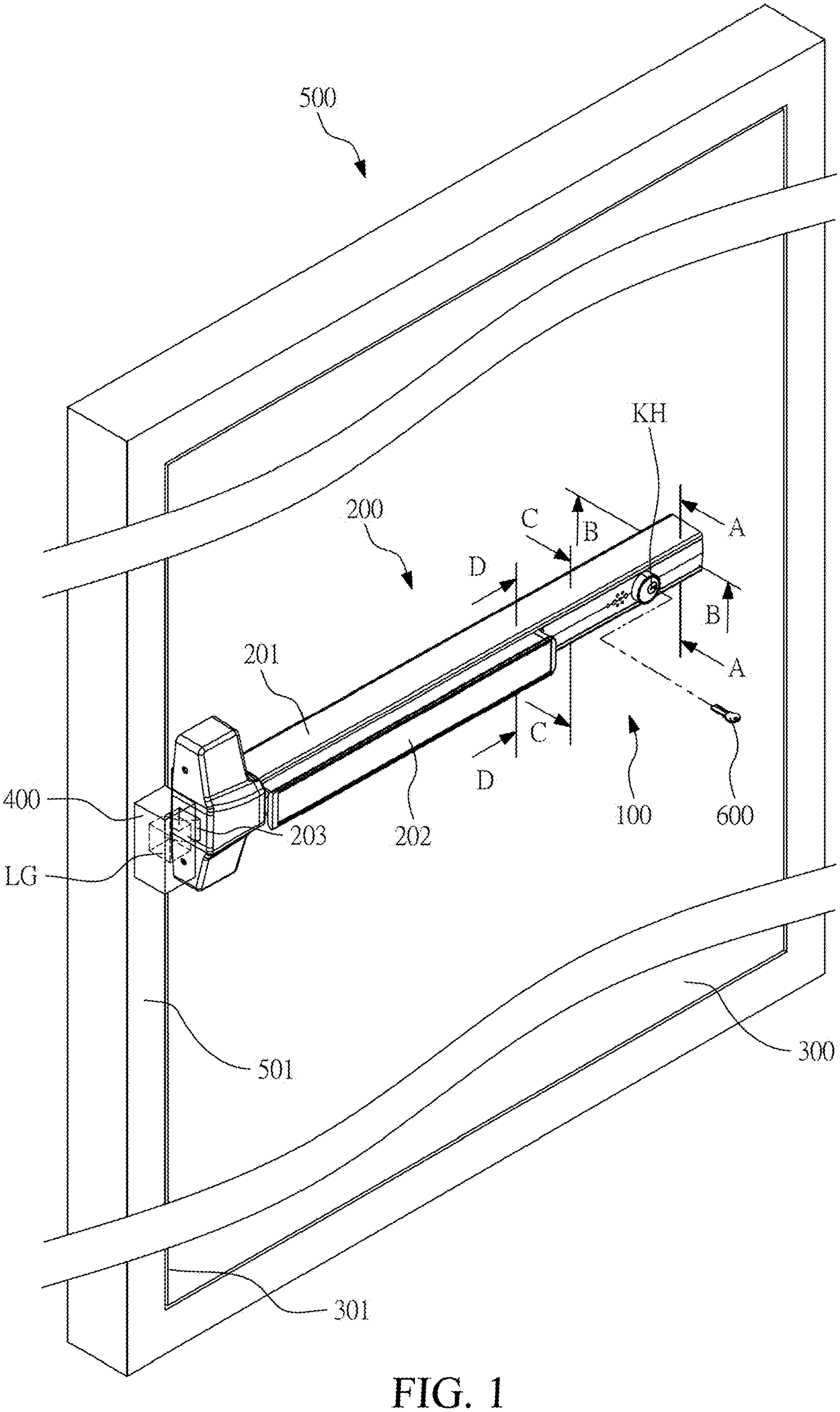
FIG. 1 is a schematic diagram showing that the switching device for delayed unlocking function is installed in the flat-push type emergency door-lock device according to the preferred embodiment of the present invention.
Figure 2:
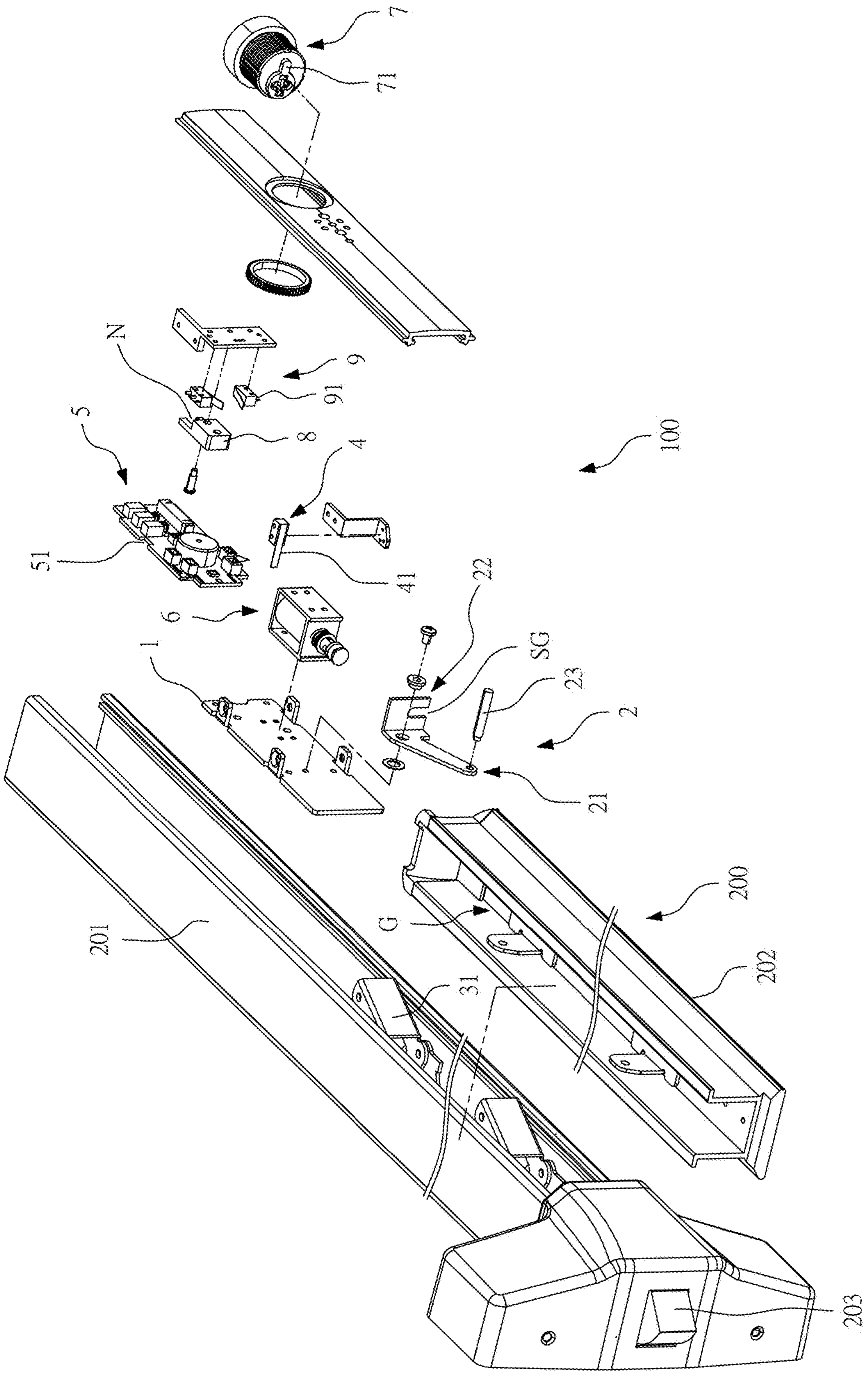
FIG. 2 is an exploded schematic diagram showing the partial components of the switching device for delayed unlocking function of the preferred embodiment of the present invention.
Figure 3:
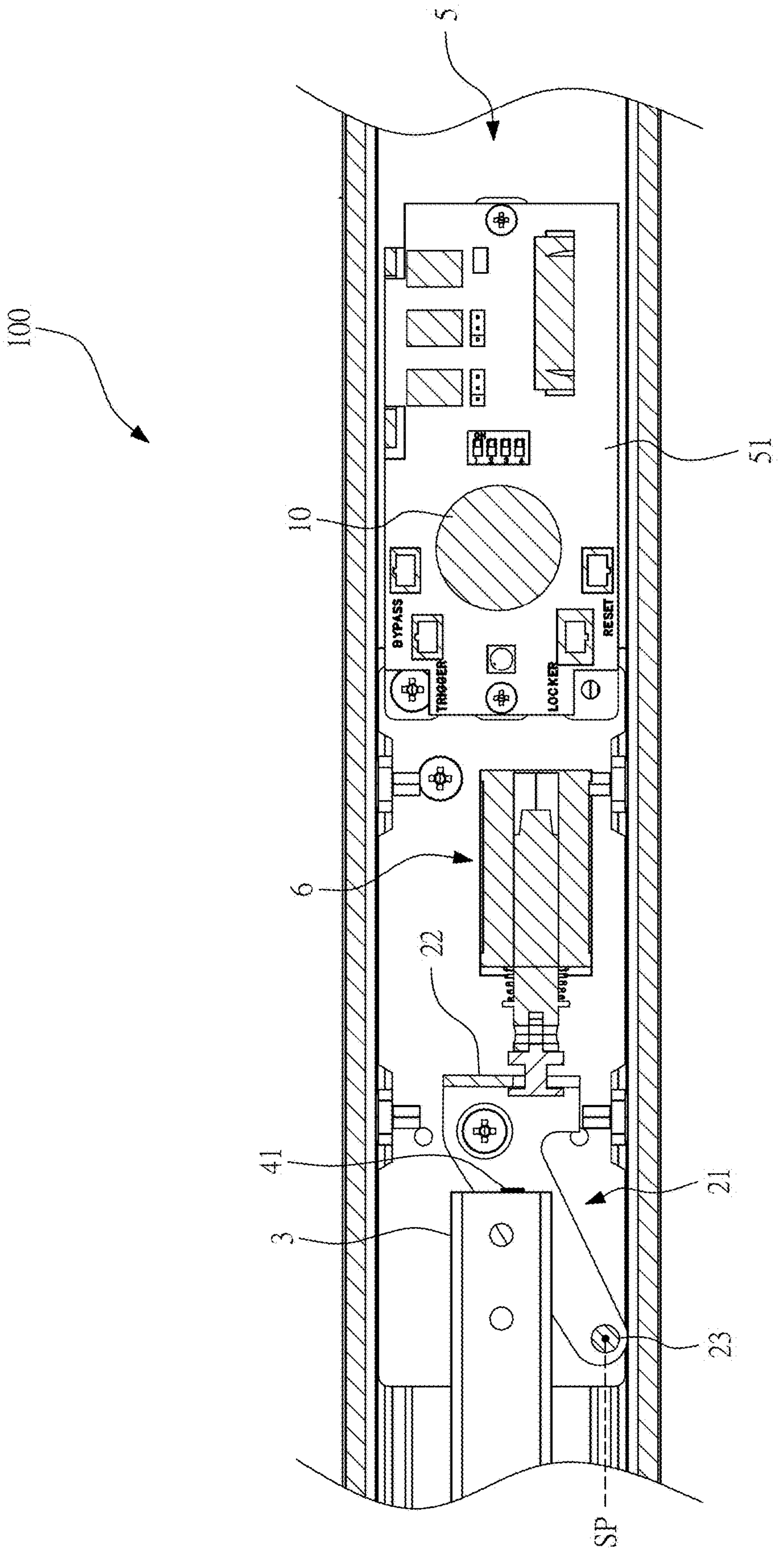
FIG. 3 is a cross-sectional view along the A-A perspective of the switching device for delayed unlocking function of the preferred embodiment of the present invention.
Figure 4:
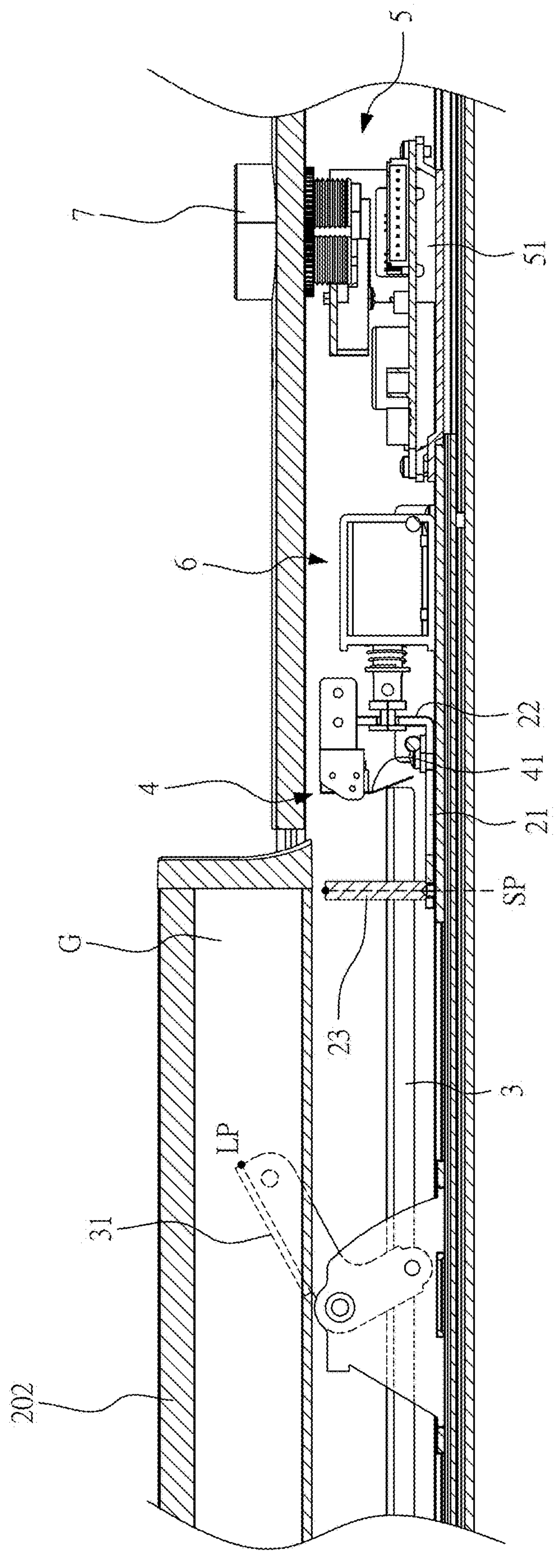
FIG. 4 is a cross-sectional view along the B-B perspective of the switching device for delayed unlocking function of the preferred embodiment of the present invention.
Figure 5:
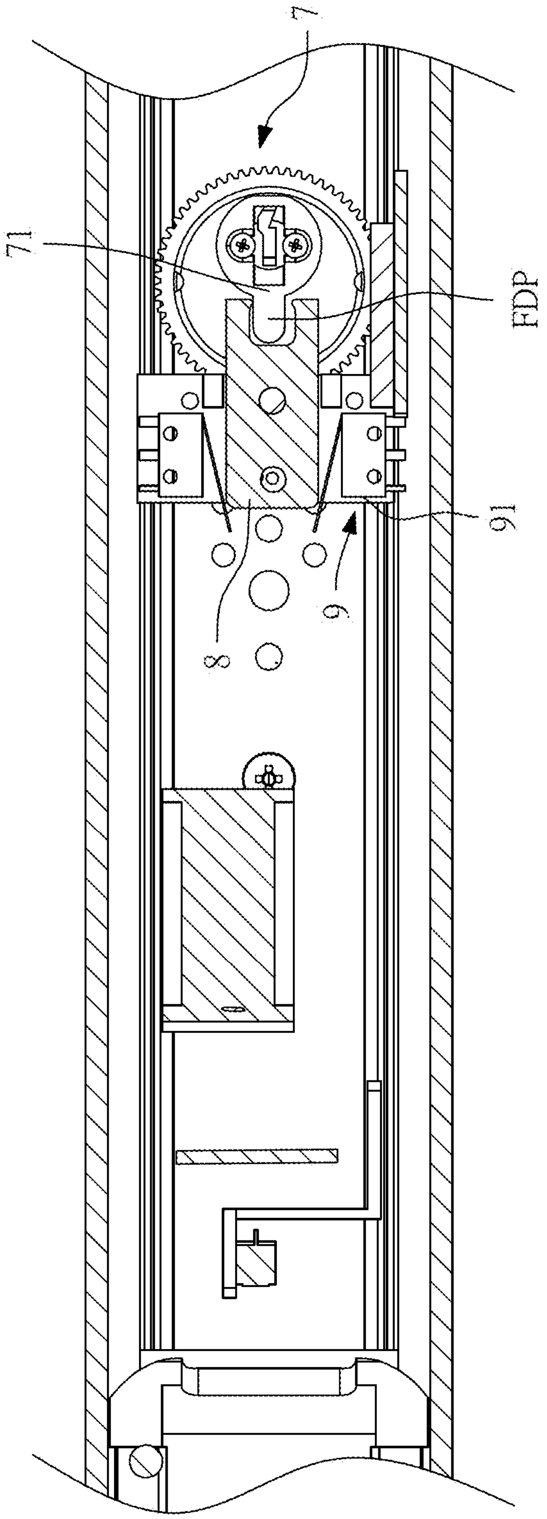
FIG. 5 is a cross-sectional view along the C-C perspective of the switching device for delayed unlocking function of the preferred embodiment of the present invention.
Figure 6:
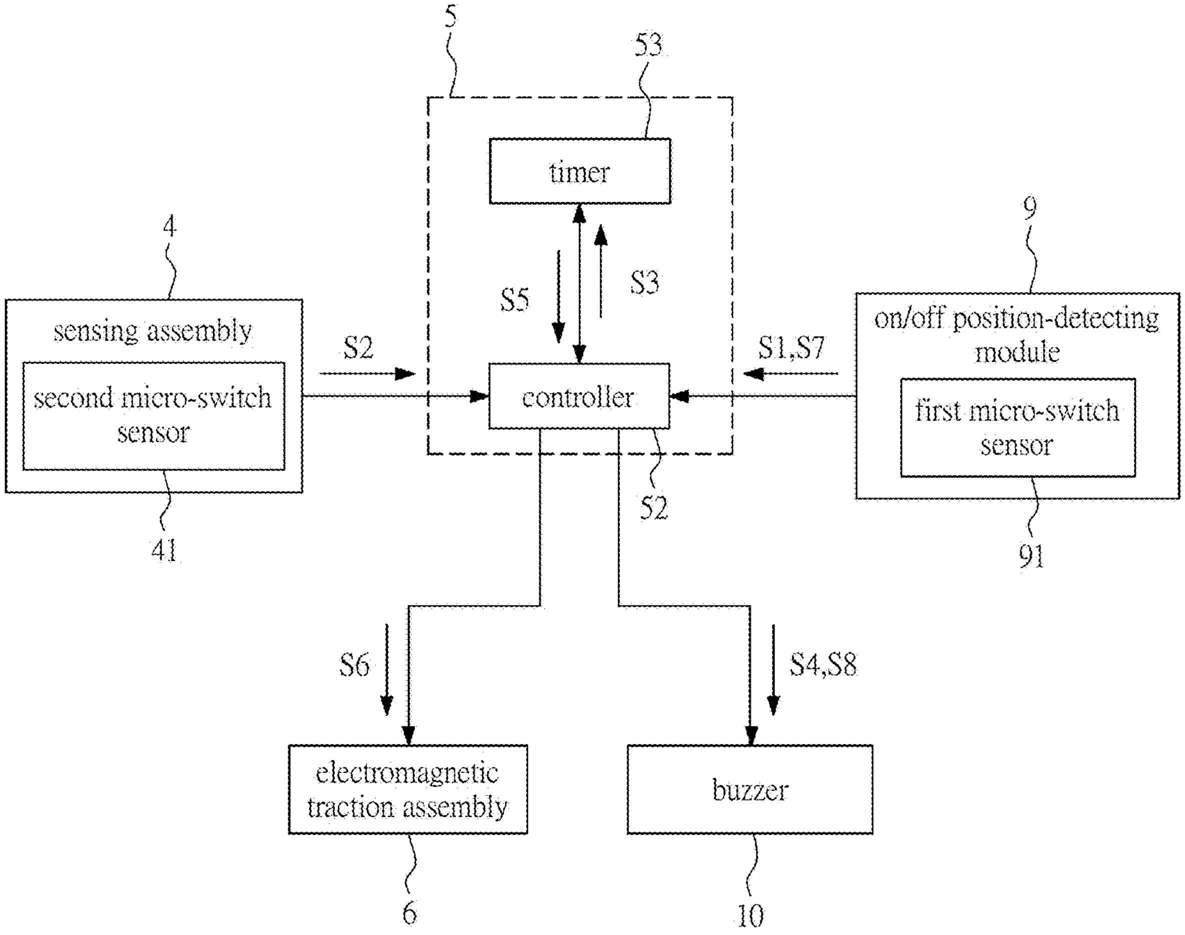
FIG. 6 is a functional block diagram of the internal main circuit of the switching device for delayed unlocking function of the preferred embodiment of the present invention.

Referring to FIG. 1 to FIG. 6; where FIG. 1 is a schematic diagram showing that the switching device for delayed unlocking function is installed in the flat-push type emergency door-lock device according to the preferred embodiment of the present invention, FIG. 2 is an exploded schematic diagram showing the partial components of the switching device for delayed unlocking function of the preferred embodiment of the present invention, FIG. 3 is a cross-sectional view along the A-A perspective of the switching device for delayed unlocking function of the preferred embodiment of the present invention, FIG. 4 is a cross-sectional view along the B-B perspective of the switching device for delayed unlocking function of the preferred embodiment of the present invention, FIG. 5 is a cross-sectional view along the C-C perspective of the switching device for delayed unlocking function of the preferred embodiment of the present invention, and FIG. 6 is a functional block diagram of the internal main circuit of the switching device for delayed unlocking function of the preferred embodiment of the present invention.

As shown from FIG. 1 to FIG. 6, a switching device for delayed unlocking function (the "function switching device" hereinafter) 100 is disposed at a flat-push type emergency door-lock device 200, the flat-push type emergency door-lock device 200 being disposed at an emergency door board 300, the flat-push type emergency door-lock device 200 including a door-lock base 201, a flat-push rod 202 disposed at the door-lock base 201, and at least one locking element (only one locking element 203 in this embodiment). A concave groove G is formed on one side of the flat-push rod 202 facing the door-lock base 201.

The flat-push rod 202 can be used to drive the unlocking drive mechanism, thereby controlling and driving the locking element 203 to extend or retract. Since the unlocking drive mechanism is a commonly used drive mechanism (designed according to various types of locks, usually composed of rocker arms, linkage rods and return components), it is not an original structure in the present invention, which will not be further described in this embodiment.

The number of locking element 203 can be one, two or three according to different types of locks such as single locking point, double locking point and triple locking point, and the locking element 203 may be a tongue, a latch or a crash bar depending on the type of locks. The emergency door board 300 includes a locking side 301 neighboring to at least one locking groove (only one locking groove LG in this embodiment). The locking groove LG is provided at a door-frame lock seat 400, and the door-frame lock seat 400 is fixed on an indoor side 501 of the door-frame 500. The number of locking grooves LG is one, two or three corresponding to the number of locking elements 203.

The function switching device 100 includes a switching-device base 1, a pushing swing arm 2, linkage rod 3, a sensing assembly 4, a timing control assembly 5, an electromagnetic traction assembly 6, a delayed unlocking function switching lock 7, a lever 8, an on/off position-detecting module 9 and a buzzer 10.

Figure 10:
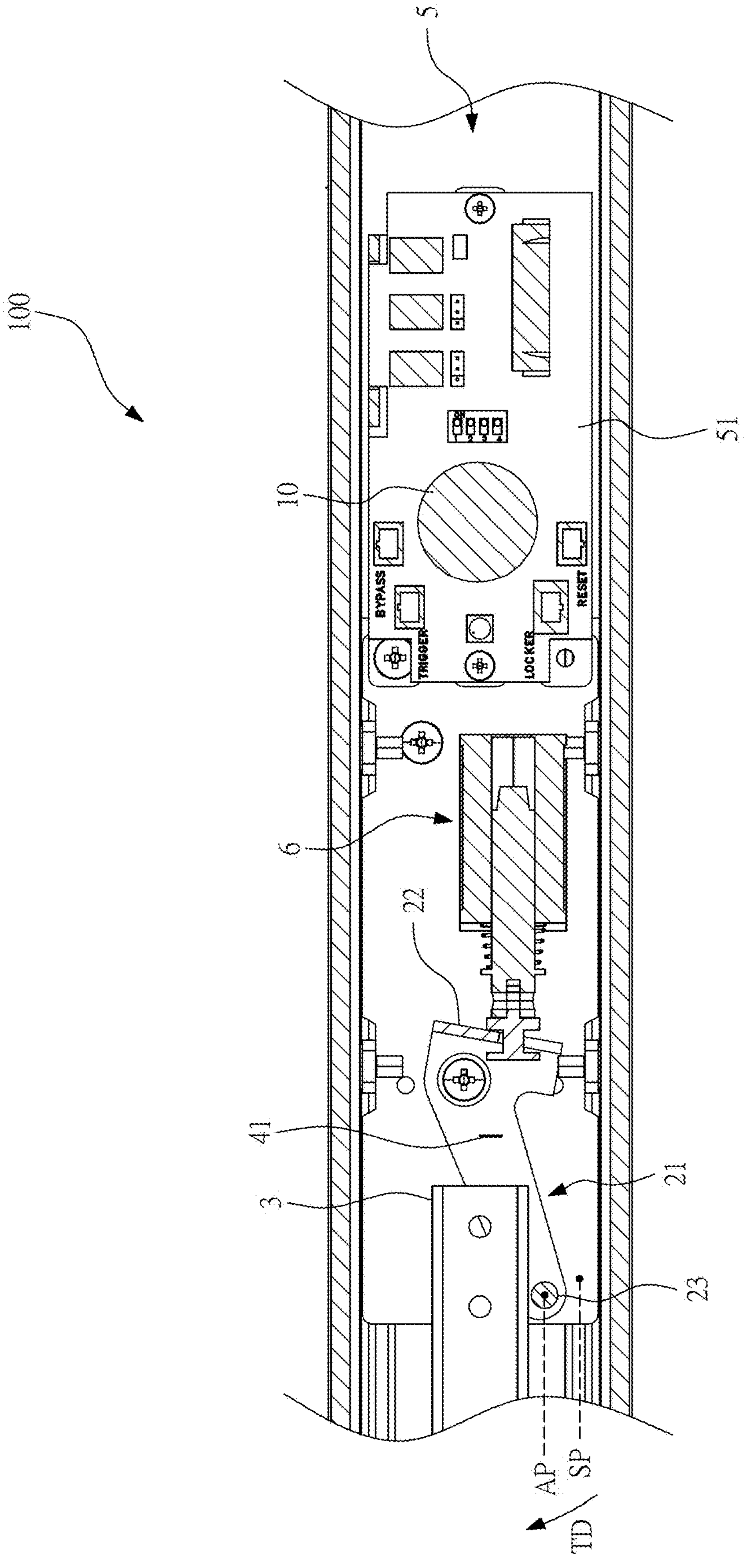
FIG. 10 is a schematic diagram illustrating the positional relationship of partial components of the switching device for delayed unlocking function of the preferred embodiment of the present invention when the stopper moves to the avoidance position after the timing reaches the predetermined delay time.

The switching-device base 1 is fixed on the door-lock base 201. The pushing swing arm 2 is pivoted to the switching-device base 1 and includes a swing arm body 21, a stopper plate 22 and a stopper 23. The swing arm body 21 is pivoted to the switching-device base 1. The stopper plate 22 extends from the swing arm body 21 and is fixed on the swing arm body 21. The stopper plate 22 includes a stroke limiting groove SG to limit the movement of the electromagnetic traction assembly 6, thereby causing the stopper 23 to be limited to move between a stop position SP and an avoidance position AP (as shown in FIG. 10). The stopper 23 is plugged and fixed on the swing arm body 21, and the stopper 23 is at the stop position SP in a locking state. Preferably, the swing arm body 21, the stopper plate 22 and the stopper 23 can be an integral component made of forging or casting.

The linkage rod 3 is pivoted to the door-lock base 201 and connects to the flat-push rod 202 in a coherent manner through at least one linkage component (this embodiment includes two linkage components, and only one of the linkage component 31 neighboring to the blocking mechanism is marked). Both ends of the linkage component 31 are pivoted to the linkage rod 3 and the flat-push rod 202 respectively, so that when the flat-push rod 202 is pressed by an operator, the linkage rod 3 is driven to move in a coherent manner. In the locking state, the flat-push rod 202 and the linkage component 31 are both located at a locking position LP, and, at this time, the unlocking drive mechanism can make the locking element 203 snap into the locking groove LG to maintain locking.

The sensing assembly 4 is fixed on the switching-device base 1 and is disposed corresponding to the linkage rod 3 and may include a second micro-switch sensor 41. The second micro-switch sensor 41 can be one of a metal contact micro-switch, a capacitive sensing micro-switch, an inductive sensing micro-switch or a piezoresistive sensing micro-switch, used to sense whether the second micro-switch sensor 41 and the flat-push rod 202 are separated or whether the second micro-switch sensor 41 changes the pressing pressure between the second micro-switch sensor 41 and the flat-push rod 202. The structure and working principle of the micro-switch are not original to the present invention and will not be further described in this embodiment. The timing control assembly 5 is electrically connected to the sensing assembly 4 and includes a circuit board 51, a controller 52 and a timer 53. The circuit board 51 is disposed at the door-lock base 201. The controller 52 is disposed at the circuit board 51 and is electrically connected to the sensing assembly 4. The timer 53 is electrically connected to the controller 52.

The electromagnetic traction assembly 6 is disposed at the switching-device base 1 and may include an electromagnet assembly or a solenoid valve assembly (it is an electromagnet assembly in this embodiment), used to drag the stopper plate 22 by an electromagnet force, thereby dragging the stopper 23 in a coherent manner to move between the stop position SP and the avoidance position AP. The structure and working principle of the electromagnet or solenoid valve are not original to the present invention and will not be further described in this embodiment. The delayed unlocking function switching lock 7 is disposed at the door-lock base 201 and includes a key hole KH and a protrusion 71. The lever 8 is disposed at the door-lock base 201 and includes a concave edge N for being plugged in by the protrusion 71.

The on/off position-detecting module 9 is disposed at the door-lock base 201 and is electrically connected to the controller 52, and it may include a first micro-switch sensor 91. When the protrusion 71 of the delayed unlocking function switching lock 7 is at a function-disabled position FDP (as shown in FIG. 5), the lever 8 does not contact with the first micro-switch sensor 91, and, at this time, the controller 52 of the function switching device 100 is in a (delayed unlocking) function disabled state.

The first micro-switch sensor 91 can be one of a metal contact micro-switch, a capacitive sensing micro-switch, an inductive sensing micro-switch or a piezoresistive sensing micro-switch, used to sense whether the first micro-switch sensor 91 and the lever 8 are in contact or whether the first micro-switch sensor 91 changes the pressing pressure between the first micro-switch sensor 91 and the lever 8. The structure and working principle of the micro-switch are not original to the present invention and will not be further described in this embodiment. The buzzer 10 is electrically connected to the controller 52.

Figure 7:
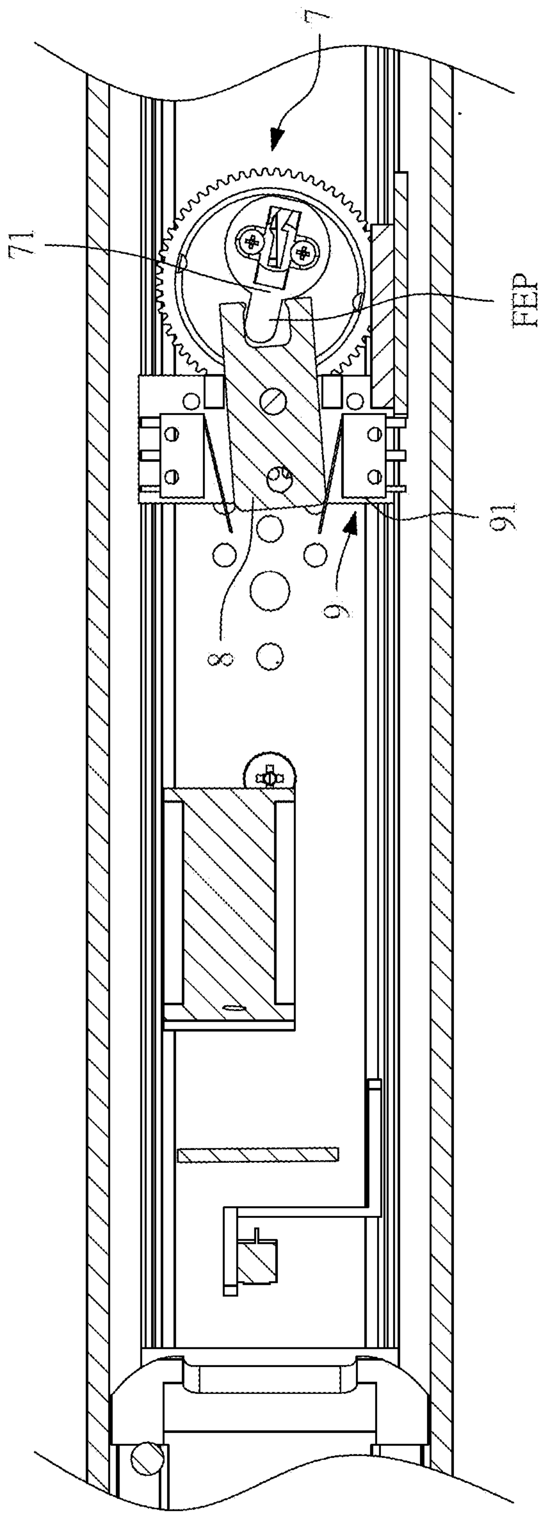
FIG. 7 is a schematic diagram showing the positional relationship of partial components when the switching device for delayed unlocking function of the preferred embodiment of the present invention is in the (delayed unlocking) function enabled state.

Referring now to FIG. 7, FIG. 7 is a schematic diagram showing the positional relationship of partial components when the switching device for delayed unlocking function of the preferred embodiment of the present invention is in the (delayed unlocking) function enabled state. In the meanwhile, please also refer to FIG. 1 and FIG. 2 together.

As shown in FIG. 7, after an administrator inserts a key 600 into the keyhole KH and drives the delayed unlocking function switching lock 7 to rotate, the protrusion 71 of the delayed unlocking function switching lock 7 will switch from the function-disabled position FDP as shown in FIG. 4 to a function-enabled position FEP. At this time, the protrusion 71 can drive the lever 8 to rotate and touch the first micro-switch sensor 91, so that the on/off position-detecting module 9 detects that the protrusion 71 of the delayed unlocking function switching lock 7 is at the function-enabled position FEP, and transmits a function-on signal S1 to the controller 52, causing the controller 52 of the function switching device 100 to enter the (delayed unlocking) function enabled state.

Figure 8:
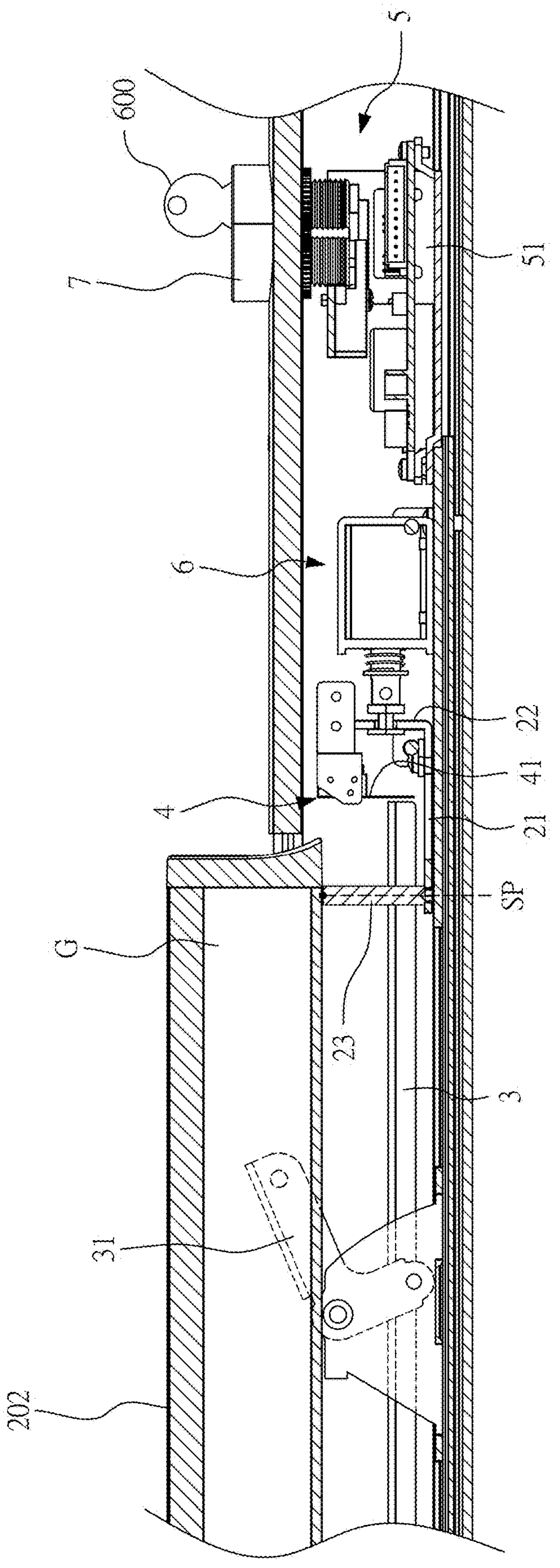
FIG. 8 is a schematic diagram showing the positional relationship of partial components of the switching device for delayed unlocking function of the preferred embodiment of the present invention after the flat-push rod is pressed down by the operator.
Figure 9:
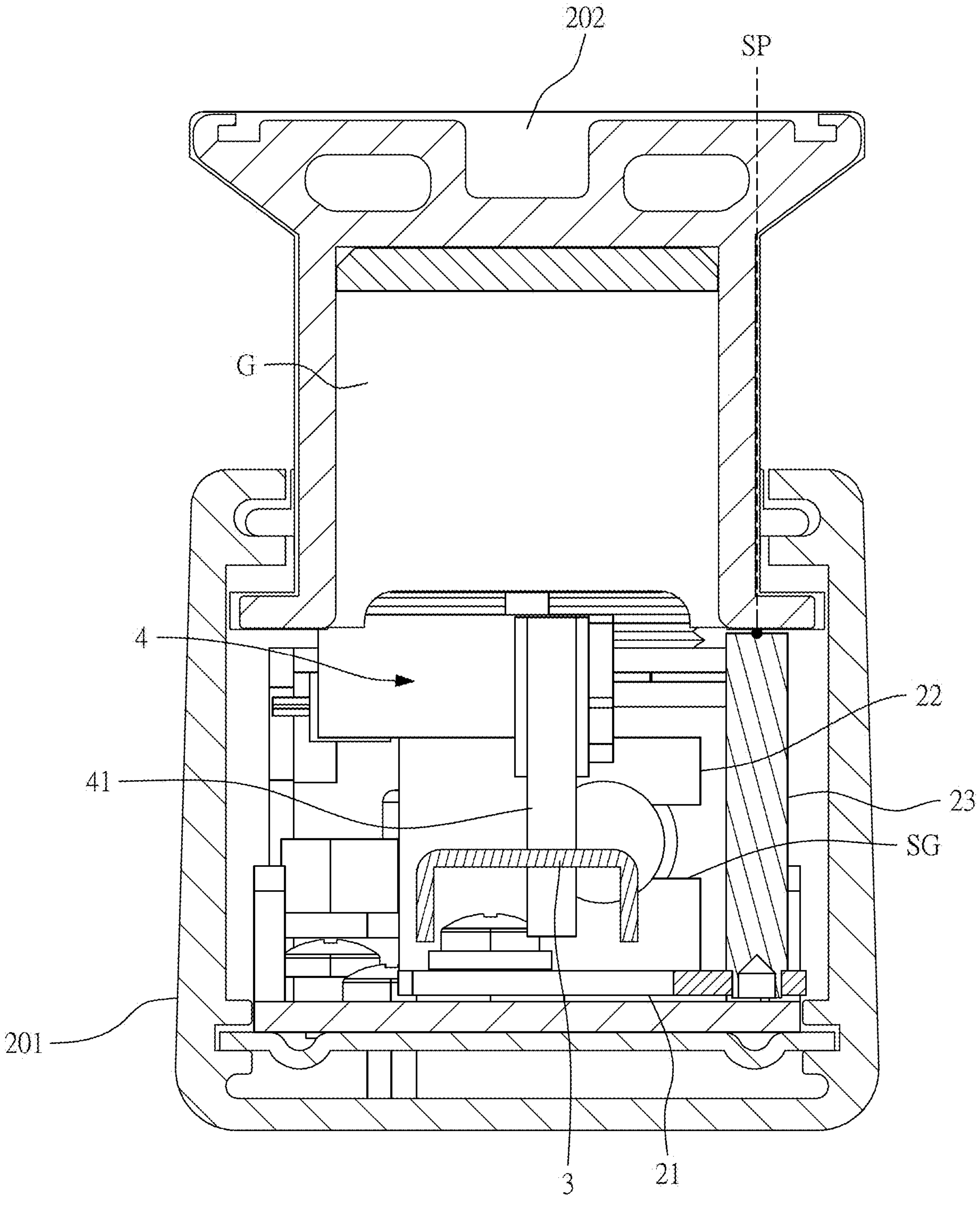
FIG. 9 is a cross-sectional view along the D-D perspective of the switching device for delayed unlocking function of the preferred embodiment of the present invention.
Figure 11:
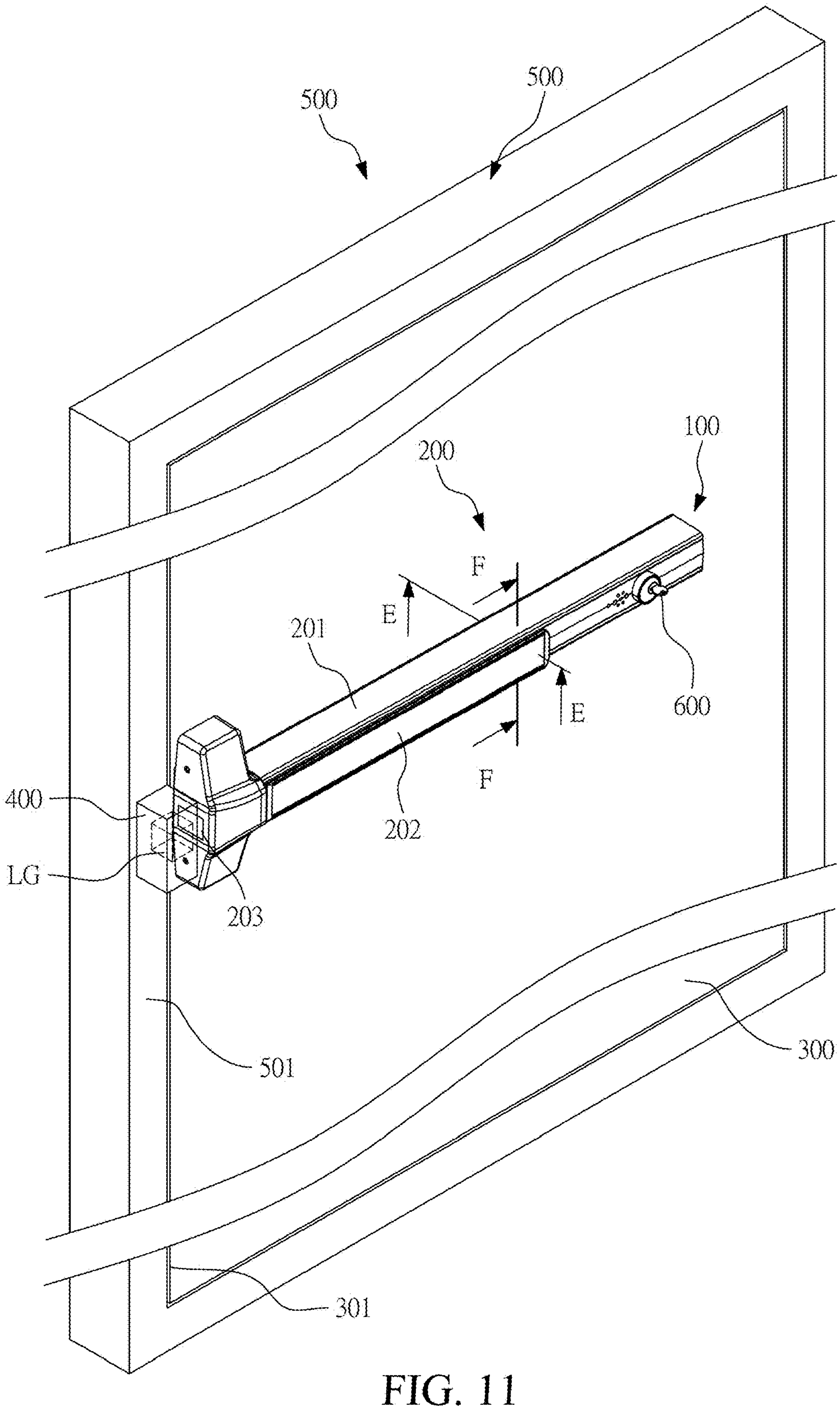
FIG. 11 is a schematic diagram showing the switching device for delayed unlocking function of the preferred embodiment of the present invention is assembled in the flat-push type emergency door-lock device and is unlocked by the operation.
Figure 12:
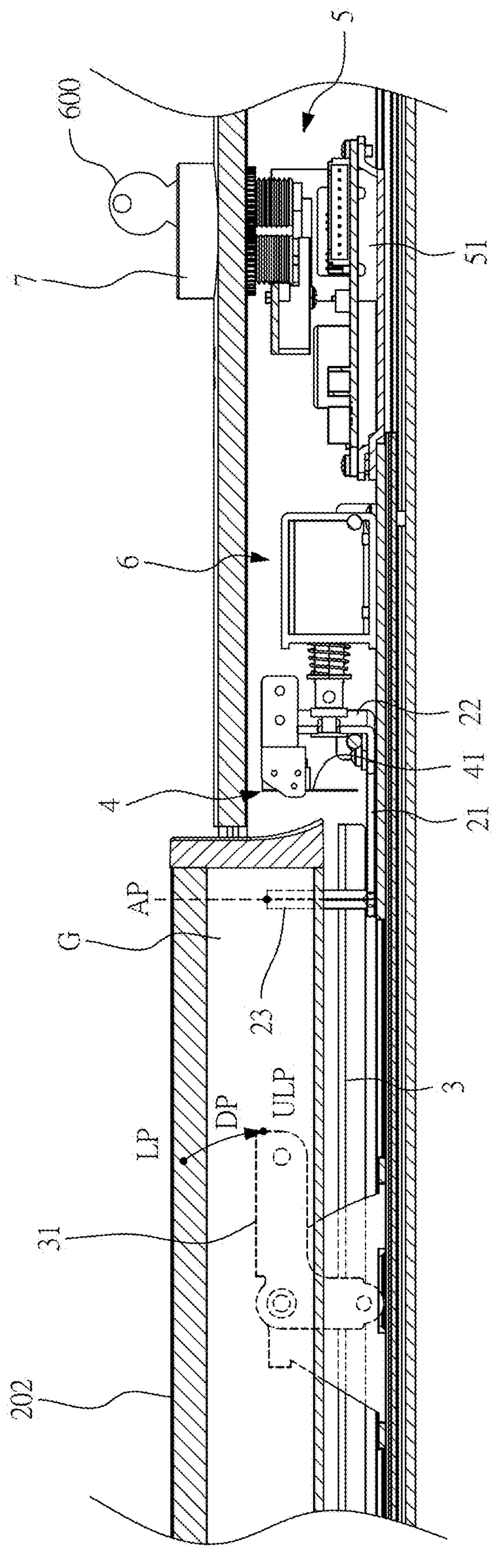
FIG. 12 is a cross-sectional view along the E-E perspective of the switching device for delayed unlocking function of the preferred embodiment of the present invention in FIG. 11.
Figure 13:
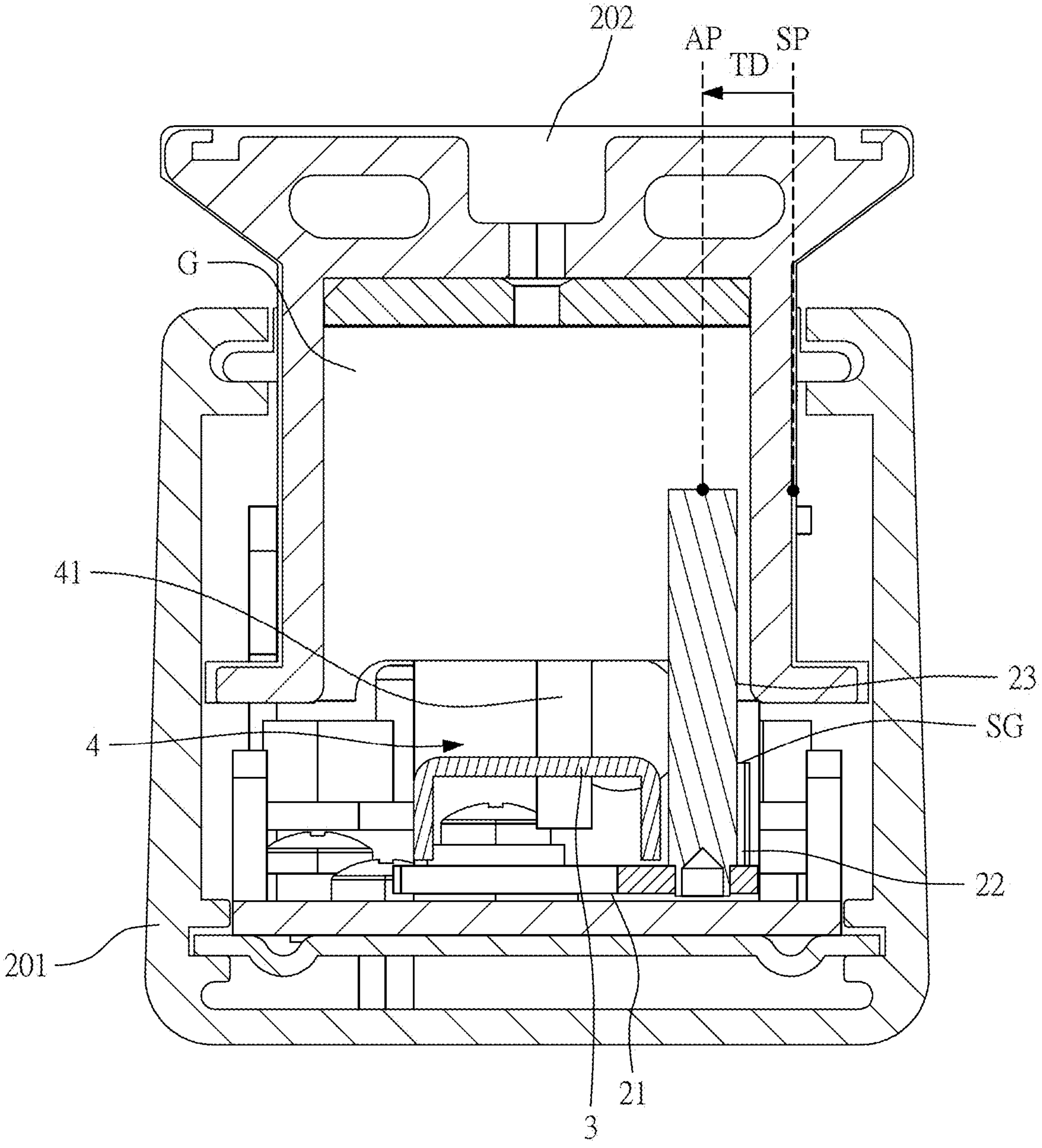
FIG. 13 is a cross-sectional view along the F-F perspective of the switching device for delayed unlocking function of the preferred embodiment of the present invention in FIG. 11.

Referring now to FIG. 8 to FIG. 13; where FIG. 8 is a schematic diagram showing the positional relationship of partial components of the switching device for delayed unlocking function of the preferred embodiment of the present invention after the flat-push rod is pressed down by the operator, FIG. 9 is a cross-sectional view along the D-D perspective of the switching device for delayed unlocking function of the preferred embodiment of the present invention, FIG. 10 is a schematic diagram illustrating the positional relationship of partial components of the switching device for delayed unlocking function of the preferred embodiment of the present invention when the stopper moves to the avoidance position after the timing reaches the predetermined delay time, FIG. 11 is a schematic diagram showing the switching device for delayed unlocking function of the preferred embodiment of the present invention is assembled in the flat-push type emergency door-lock device and is unlocked by the operation, FIG. 12 is a cross-sectional view along the E-E perspective of the switching device for delayed unlocking function of the preferred embodiment of the present invention in FIG. 11, and FIG. 13 is a cross-sectional view along the F-F perspective of the switching device for delayed unlocking function of the preferred embodiment of the present invention in FIG. 11. In the meanwhile, please also refer to FIG. 1 to FIG. 6 together.

When the controller 52 is in the (delayed unlocking) function enabled state and an operator presses down the flat-push rod 202, the flat-push rod 202 leaves the locking position LP (as shown in FIG. 4) and causes the linkage rod 3 being separated from the second micro-switch sensor 41 in a coherent manner. At this time, the stopper 23 is at the stop position SP and prevents the flat-push rod 202 from continuing to move along the push-down driving stroke DP (as shown in FIG. 12) to an unlocking position ULP (as shown in FIG. 12) to prohibit unlocking.

The administrator can set a predetermined delay time for the timer 53 according to the fire regulations of different countries, usually between 15 and 30 seconds. When the flat-push rod 202 leaves the locking position LP, the linkage rod 3 is separated from the second micro-switch sensor 41 in a coherent manner or changes the pressing pressure with the second micro-switch sensor 41. At this time, the second micro-switch sensor 41 can sense that the flat-push rod 202 leaves the locking position LP and send an unlocking-triggering signal S2 to the controller 52, causing the controller 52 to send a timing signal S3 and an alarm signal S4.

The timer 53 starts timing after receiving the timing signal S3, and the timer 53 sends a timing-off signal S5 back to the controller 52 after the timing reaches the predetermined delay time, thereby causing the controller 52 to generate a state-switching signal S6 and to send it to the electromagnetic traction assembly 6. After receiving the state-switching signal S6, the electromagnetic traction assembly 6 drags the stopper plate 22 to cause the stopper 23 to move along a traction direction TD (as shown in FIG. 10) from the stop position SP to the avoidance position AP. The avoidance position AP corresponding to the concave groove G is to avoid the flat-push rod 202, thereby allowing the flat-push rod 202 to continue to move along the push-down driving stroke DP toward the unlocking position ULP, and at the unlocking position ULP, driving the unlocking drive mechanism to cause the locking element 203 being separated from the locking groove LG to unlock.

After receiving the alarm signal S4, the buzzer 10 issues an alarm. After the buzzer 10 issues the alarm, if one wants to cancel the alarm, he/she can insert the key 500 into the key hole KH and drive the delayed unlocking function switching lock 7 to rotate, so that the protrusion 71 of the delayed unlocking function switching lock 7 will move from the function-enabled position FEP to switch back to the function-disabled position FDP again. At this time, the protrusion 71 can drive the lever 8 to rotate without contacting the first micro-switch sensor 91, so that the first micro-switch sensor 91 detects that the protrusion 71 of the delayed unlocking function switching lock 7 is at the function-disabled position FDP and sends a function-off signal S7 to the controller 52, causing the controller 52 to enter the (delayed unlocking) function disabled state again and to send an alarm clear signal S8 to the buzzer 10 to cause the buzzer 10 to stop issuing the alarm.

To sum up the aforementioned, in the function switching device 100 provided by the present invention, the sensing assembly 4 disposed at the door-lock base 201 is used to sense that the linkage rod 3 is driven by the flat-push rod 202 and, therefore, to detect that the flat-push rod 202 leaves the locking position LP, thereby activating the delayed unlocking function. After the predetermined delay time is reached, the electromagnetic traction assembly 6 drags the stopper 23 to move to the avoidance position AP, thereby allowing the flat-push rod 202 to continue to move along the push-down driving stroke DP to delay unlocking.

Additionally, since all the elements related to the delayed unlocking means (including the pushing swing arm 2, the sensing assembly 4, the timing control assembly 5 and the electromagnetic traction assembly 6) are all located away from the mechanisms related to unlocking and are installed in the door-lock base 201, and the original internal mechanisms of the flat-push type emergency door-lock device 200 are avoided, that is to say, when the flat-push rod 202 of the flat-push type emergency door-lock device 200 is pressed down or lifted up, the original internal mechanisms will not have contact movement with the blocking mechanism of delayed unlocking function. Therefore, the delayed unlocking function can be realized without changing the original unlocking-related mechanisms at all, thereby achieving the effect of reducing the preparation and installation costs of sensing and delayed unlocking functional components.

While the present invention has been particularly shown and described with reference to a preferred embodiment, it will be understood by those skilled in the art that various changes in form and detail may be without departing from the spirit and scope of the present invention.

What is claimed is:

1. A switching device for delayed unlocking function, wherein the switching device is disposed at a flat-push type emergency door-lock device, the flat-push type emergency door-lock device being is disposed at an emergency door board, the flat-push type emergency door-lock device including comprises a door-lock base, and a flat-push rod disposed at the door-lock base, and a concave groove being formed on one side of the flat-push rod facing the door-lock base, wherein the switching device comprises:

a switching-device base, fixed on the door-lock base;

a pushing swing arm, pivoted to the switching-device base, including a stopper, wherein when the pushing swing arm is driven, the stopper is moved between a stop position and an avoidance position, wherein the stopper is switchably at the avoidance position in a delayed unlocking function disabled state and is preset at the stop position in a delayed unlocking function enabled state;

a linkage rod, pivoted to the door-lock base, connected to the flat-push rod in a coherent manner;

a sensing assembly, fixed on the switching-device base, disposed corresponding to the linkage rod, used to send an unlocking-triggering signal by sensing that the linkage rod changes from being in contact with the sensing assembly to being separated from the sensing assembly according to the flat-push rod is pushed in the delayed unlocking function enabled state;

a timing control assembly, electrically connected to the sensing assembly, thereby sending a state-switching signal after the unlocking-triggering signal is received and a predetermined delay time is passed; and an electromagnetic traction assembly, disposed at the switching-device base, dragging the pushing swing arm to cause the stopper to move from the stop position to the avoidance position after receiving the state-switching signal;

wherein when the stopper is at the stop position, the flat-push rod is blocked to prevent the flat-push rod from being pushed and prohibit unlocking; wherein when the stopper is at the avoidance position, the stopper avoids the flat-push rod corresponding to the concave groove, thereby allowing the flat-push rod to continue to be pushed to complete unlocking.

2. The switching device for delayed unlocking function of claim 1, wherein the pushing swing arm further includes:

a swing arm body, pivoted to the switching-device base, wherein the stopper is plugged and fixed on the swing arm body; and a stopper plate, extending from and fixed on the swing arm body, including a stroke limiting groove to limit the movement of the electromagnetic traction assembly.

3. The switching device for delayed unlocking function of claim 1, further including:

a delayed unlocking function switching lock, disposed at the door-lock base, driven by a key to move between a function-enabled position and a function-disabled position; and an on/off position-detecting module, disposed at the door-lock base, electrically connected to the timing control assembly, thereby when sensing the delayed unlocking function switching lock is at the function-enabled position, a function-on signal is sent to the timing control assembly, so that the timing control assembly enters the delayed unlocking function enabled state; thereby when sensing the delayed unlocking function switching lock is at the function-disabled position, a function-off signal is sent to the timing control assembly, so that the timing control assembly enters the delayed unlocking function disabled state.

4. The switching device for delayed unlocking function of claim 3, wherein the on/off position-detecting module further includes a first micro-switch sensor, wherein when the delayed unlocking function switching lock is at the function-enabled position, the first micro-switch sensor contacts with the delayed unlocking function switching lock to generate and send the function-on signal accordingly, wherein when the delayed unlocking function switching lock is at the function-disabled position, the first micro-switch sensor is separated from the delayed unlocking function switching lock to generate and send the function-off signal accordingly.

5. The switching device for delayed unlocking function of claim 4, further including a lever, the lever being disposed at the door-lock base and being driven by the delayed unlocking function switching lock, wherein when the delayed unlocking function switching lock is at the function-enabled position, the lever contacts with the first micro-switch sensor so that the first micro-switch sensor detects that the delayed unlocking function switching lock is at the function-enabled position.

6. The switching device for delayed unlocking function of claim 1, wherein the timing control assembly includes:

a circuit board, disposed at the door-lock base;

a controller, disposed at the circuit board, electrically connected to the sensing assembly, used to generate a timing signal after receiving the unlocking-triggering signal in the delayed unlocking function enabled state; and a timer, electrically connected to the controller, used to start timing after receiving the timing signal in the delayed unlocking function enabled state, used to send a timing-off signal after the timing reaches the predetermined delay time, thereby causing the controller to send the state-switching signal.

7. The switching device for delayed unlocking function of claim 6, further including a buzzer, the buzzer being electrically connected to the controller, the controller further generating an alarm signal after receiving the unlocking-triggering signal in the delayed unlocking function enabled state, the controller transmitting the alarm signal to the buzzer to cause the buzzer to issue an alarm.

8. The switching device for delayed unlocking function of claim 1, wherein the sensing assembly includes a second micro-switch sensor, the second micro-switch sensor being disposed at the switching-device base and contacting with the linkage rod, wherein when the linkage rod is driven by the flat-push rod in the delayed unlocking function enabled state so that the second micro-switch sensor is separated from the linkage rod and sends the unlocking-triggering signal.

* * * * *